United States Patent
Masunari et al.

(10) Patent No.: US 11,367,574 B2
(45) Date of Patent: Jun. 21, 2022

(54) MULTILAYER CERAMIC CAPACITOR

(71) Applicant: Murata Manufacturing Co., Ltd., Nagaokakyo (JP)

(72) Inventors: Akio Masunari, Nagaokakyo (JP); Yukie Watanabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 122 days.

(21) Appl. No.: 16/805,889

(22) Filed: Mar. 2, 2020

(65) Prior Publication Data

US 2020/0303124 A1 Sep. 24, 2020

(30) Foreign Application Priority Data

Mar. 22, 2019 (JP) .............................. JP2019-055120

(51) Int. Cl.
*H01G 4/30* (2006.01)
*H01G 4/08* (2006.01)
(Continued)

(52) U.S. Cl.
CPC ............... *H01G 4/30* (2013.01); *H01G 4/008* (2013.01); *H01G 4/1209* (2013.01);
(Continued)

(58) Field of Classification Search
CPC .......... H01G 4/232; H01G 4/248; H01G 4/30; H01G 4/228; H01G 4/1209; H01G 4/33; H01G 4/008
(Continued)

(56) References Cited

U.S. PATENT DOCUMENTS 6,258,691 B1 7/2001 Kim
2011/0157767 A1* 6/2011 Hur .......................... H01G 4/01
361/305
(Continued)

FOREIGN PATENT DOCUMENTS

JP 2000-049304 A 2/2000
JP 2003-243245 A 8/2003
(Continued)

OTHER PUBLICATIONS

Official Communication issued in corresponding Chinese Patent Application No. 202010184165.4, dated Jun. 24, 2021.
(Continued)

*Primary Examiner* — Arun Ramaswamy
(74) *Attorney, Agent, or Firm* — Keating & Bennett, LLP

(57) ABSTRACT

A multilayer ceramic capacitor includes a ceramic body including a stack of dielectric layers and internal electrodes and including main surfaces facing each other in a stacking direction, lateral surfaces facing each other in a width direction, and end surfaces facing each other in a length direction, and an external electrode electrically connected with the internal electrodes on the end surfaces. The external electrode includes an end surface covering portion covering each of the end surfaces, and a main surface covering portion covering portions of the main surfaces. The end surface and main surface covering portions each include a base electrode layer covering the ceramic body, and a plating layer covering the base electrode layer. The end surface
(Continued)

covering portion further includes, between the base electrode layer and the plating layer, a sintered metal layer including a component different from that of the base electrode layer.

18 Claims, 6 Drawing Sheets

(51) Int. Cl.
    *H01G 4/33*     (2006.01)
    *H01G 4/12*     (2006.01)
    *H01G 4/224*     (2006.01)
    *H01G 4/232*     (2006.01)
    *H01G 4/008*     (2006.01)

(52) U.S. Cl.
    CPC ............. *H01G 4/224* (2013.01); *H01G 4/232* (2013.01); *H01G 4/33* (2013.01)

(58) Field of Classification Search
    USPC .... 361/321.2, 301.4, 306.3, 309, 321.3, 303
    See application file for complete search history.

(56) References Cited

U.S. PATENT DOCUMENTS

| | | | |
|---|---|---|---|
| 2013/0107421 A1* | 5/2013 | Zenzai | H01G 4/005 |
| | | | 361/321.1 |
| 2014/0022689 A1 | 1/2014 | Kwag et al. | |
| 2014/0174800 A1 | 6/2014 | Chang et al. | |
| 2016/0254094 A1* | 9/2016 | Lee | H01G 4/30 |
| | | | 361/301.4 |
| 2016/0293332 A1* | 10/2016 | Kato | H01G 4/232 |
| 2017/0294268 A1* | 10/2017 | Katsuta | H01G 4/012 |
| 2018/0286589 A1* | 10/2018 | Cho | H01G 4/228 |

FOREIGN PATENT DOCUMENTS

| | | |
|---|---|---|
| JP | 2003-243249 A | 8/2003 |
| WO | 2010/087221 A1 | 8/2010 |

OTHER PUBLICATIONS

Official Communication issued in corresponding Chinese Patent Application No. 202010184165.4, dated Mar. 23, 2022.

* cited by examiner

MULTILAYER CERAMIC CAPACITOR

CROSS REFERENCE TO RELATED APPLICATIONS

This application claims the benefit of priority to Japanese Patent Application No. 2019-055120 filed on Mar. 22, 2019. The entire contents of this application are hereby incorporated herein by reference.

BACKGROUND OF THE INVENTION

1. Field of the Invention

The present invention relates to multilayer ceramic capacitors.

2. Description of the Related Art

A conventionally known multilayer ceramic capacitor includes a ceramic body including a stack of dielectric layers and internal electrodes, and an external electrode electrically connected with the internal electrodes and provided on each of opposite end surfaces of the ceramic body.

Japanese Patent Laid-Open No. 2003-243249 discloses a multilayer ceramic capacitor which has the above structure, in which the external electrode includes a base electrode layer containing copper, a Ni plating layer covering the base electrode layer, and a Sn plating layer covering the Ni plating layer.

Multilayer ceramic capacitors are highly desired to have higher capacitances. In order to increase the capacitance of the multilayer ceramic capacitor without increasing the size thereof, the film thickness of the external electrode is reduced in one method.

However, reducing the film thickness of the external electrode results in a reduced distance between an end of the internal electrode and a surface of the external electrode in the length direction. This reduces a path through which water enters from the end side in the length direction, which may lead to lower moisture resistant reliability.

SUMMARY OF THE INVENTION

Preferred embodiments of the present invention provide multilayer ceramic capacitors that are each capable of reducing or preventing a decrease in moisture resistant reliability even when a thickness of an external electrode is reduced.

A multilayer ceramic capacitor according to a preferred embodiment of the present invention includes a ceramic body including a stack of a plurality of dielectric layers and a plurality of internal electrodes and including a first main surface and a second main surface facing each other in a stacking direction, a first lateral surface and a second lateral surface facing each other in a width direction orthogonal or substantially orthogonal to the stacking direction, and a first end surface and a second end surface facing each other in a length direction orthogonal or substantially orthogonal to the stacking direction and the width direction; and an external electrode electrically connected with the plurality of internal electrodes and provided on each of the first end surface and the second end surface of the ceramic body. The external electrode includes an end surface covering portion covering the first end surface and the second end surface, and a main surface covering portion covering a portion of the first main surface and a portion of the second main surface. The end surface covering portion and the main surface covering portion each include a base electrode layer covering the ceramic body and a plating layer covering the base electrode layer. The end surface covering portion further includes, between the base electrode layer and the plating layer, a sintered metal layer including a component different from that of the base electrode layer.

The base electrode layer may include glass.

The main surface covering portion may not include the sintered metal layer.

A metal included in the sintered metal layer has a melting point lower than a melting point of a metal included in the base electrode layer.

Cavities included in the sintered metal layer may have an average size smaller than an average size of cavities included in the base electrode layer.

A portion of the sintered metal layer may have a thickness of about 0.5 µm or more, the portion being located on an outer side in the length direction at a position of an end of one of the plurality of internal electrodes in the width direction, the end being located on an outermost side in the stacking direction.

A portion of the base electrode layer of the end surface covering portion may have a thickness of about 0.2 µm or less, the portion being located on an outer side in the length direction at a position of an end of one of the plurality of internal electrodes in the width direction, the end being located on an outermost side in the stacking direction.

The multilayer ceramic capacitors according to preferred embodiments of the present invention each include, between the base electrode layer and the plating layer at the portion of the external electrode which is located on the end surface side, the sintered metal layer including a component different from that of the base electrode layer, and thus, are able to reduce or prevent water ingress from the end side in the length direction, which results in improved moisture resistant reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The features of the present invention will now be described in detail with reference to preferred embodiments of the present invention and the drawings.

Figure 1:
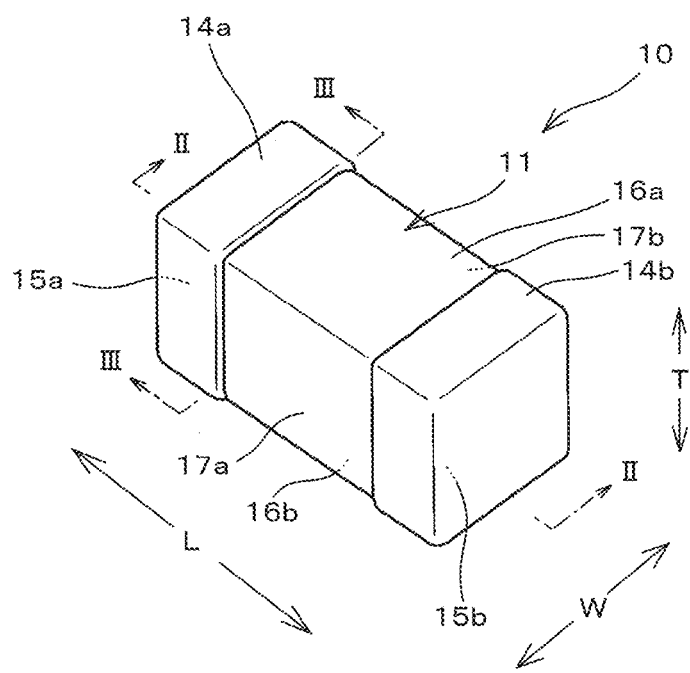
FIG. 1 is a perspective view of a multilayer ceramic capacitor according to a preferred embodiment of the present invention.
Figure 2:
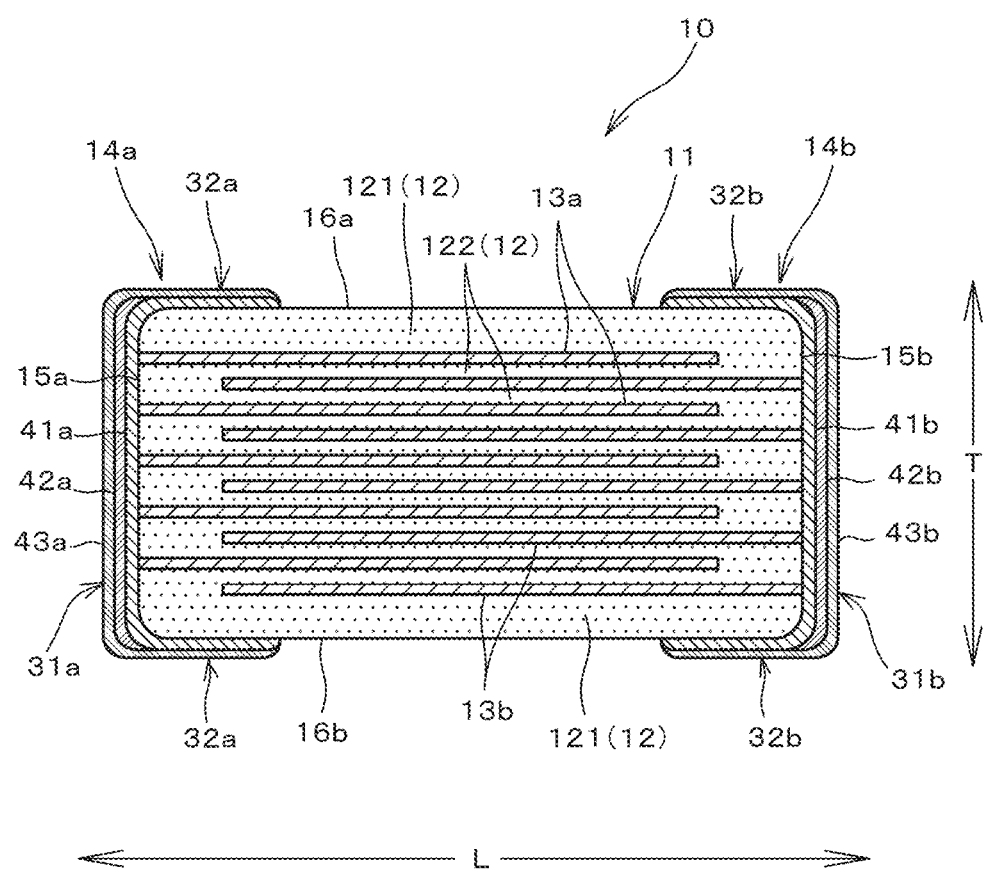
FIG. 2 is a sectional view of the multilayer ceramic capacitor shown in FIG. 1, which is taken along the line II-II.
Figure 3:
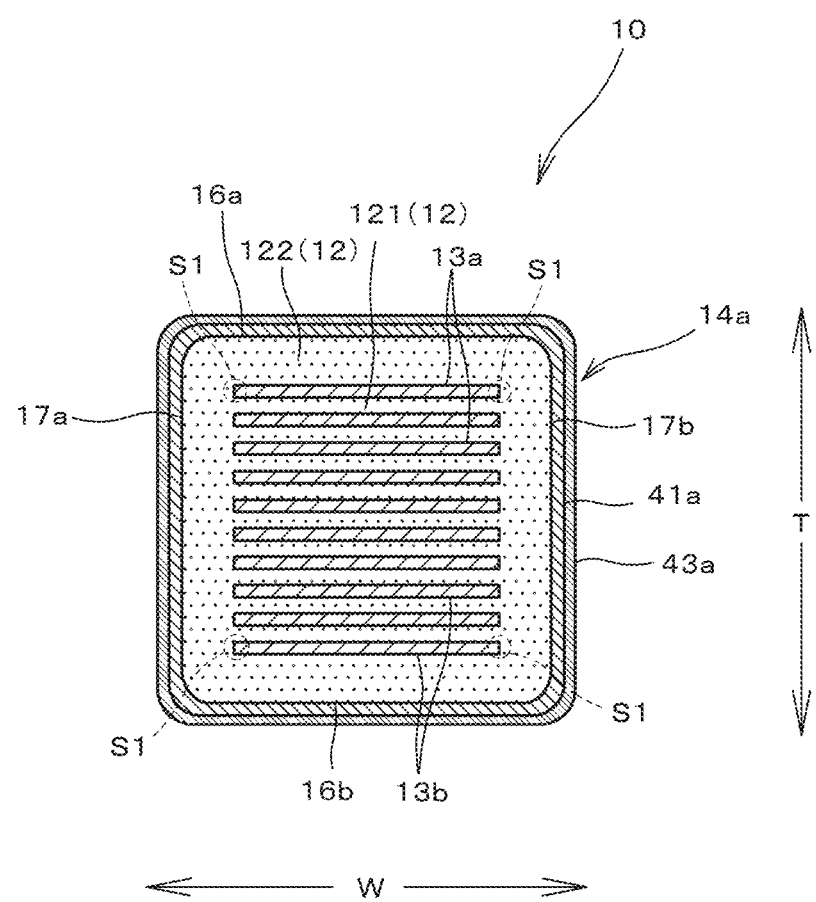
FIG. 3 is a sectional view of the multilayer ceramic capacitor shown in FIG. 1, which is taken along the line III-III.

FIG. 1 is a perspective view of a multilayer ceramic capacitor 10 according to a preferred embodiment of the present invention. FIG. 2 is a sectional view of multilayer ceramic capacitor 10 shown in FIG. 1, which is taken along the line II-II. FIG. 3 is a sectional view of multilayer ceramic capacitor 10 shown in FIG. 1, which is taken along the line III-III.

As shown in FIGS. 1 to 3, multilayer ceramic capacitor 10 is an electronic component having a rectangular or substantially rectangular parallelepiped shape and includes a ceramic body 11 and a pair of external electrodes 14a and 14b. The pair of external electrodes 14a and 14b are opposed to each other as shown in FIG. 1.

Herein, the direction in which the pair of external electrodes 14a and 14b are opposed to each other is defined as a length direction L of multilayer ceramic capacitor 10, a direction in which dielectric layers 12 and internal electrodes 13a and 13b, which will be described below, are stacked is defined as a stacking direction T, and a direction orthogonal or substantially orthogonal to both of length direction L and stacking direction T is defined as a width direction W.

The dimensions of multilayer ceramic capacitor 10 in length direction L, width direction W, and stacking direction T are preferably about 0.6 mm, about 0.3 mm, and about 0.3 mm in one example and about 0.4 mm, about 0.2 mm, and about 0.2 mm in another example. Note that the dimensions of multilayer ceramic capacitor are not limited to the above values. The dimensions of multilayer ceramic capacitor 10 can be measured with a micrometer or an optical microscope.

Ceramic body 11 includes a first end surface 15a and a second end surface 15b facing each other in length direction L, a first main surface 16a and a second main surface 16b facing each other in the stacking direction T, and a first lateral surface 17a and a second lateral surface 17b facing each other in width direction W.

First end surface 15a includes first external electrode 14a, and second end surface 15b includes second external electrode 14b.

Preferably, ceramic body 11 has rounded corners and rounded ridges. Herein, the corner is a portion at which three surfaces of ceramic body 11 meet together, and the ridge is a portion at which two surfaces of stack 11 meet together. In a preferred embodiment of the present invention, first end surface 15a and second end surface 15b include corners and ridges at which the end surface meets first main surface 16a and second main surface 16b and first lateral surface 17a and second lateral surface 17b.

As shown in FIGS. 2 and 3, ceramic body 11 includes a stack of a plurality of dielectric layers 12 and a plurality of internal electrodes 13a and 13b. Internal electrodes 13a and 13b include first internal electrodes 13a and second internal electrodes 13b. More specifically, ceramic body 11 has a structure in which first internal electrodes 13a and second internal electrodes 13b are stacked alternately in stacking direction T with dielectric layer 12 therebetween.

Dielectric layers 12 include external-layer dielectric layers 121 located on the opposite outer sides of ceramic body 11 in stacking direction T and internal-layer dielectric layers 122 each located between first internal electrode 13a and second internal electrode 13b. External-layer dielectric layer 121 preferably has a thickness of, for example, about 10 μm or more and about 50 μm or less. Internal-layer dielectric layer 122 preferably has a thickness of, for example, about 0.4 μm or more and about 5.0 μm or less.

Dielectric layer 12 is preferably made of, for example, a ceramic material mainly including $BaTiO_3$, $CaTiO_3$, $SrTiO_3$, $CaZrO_3$, or the like. The above main component may include a lower content of sub-ingredient than that of the main ingredient, such as Mn compound, Fe compound, Cr compound, Co compound, or Ni compound, for example.

First internal electrode 13a and second internal electrode 13b preferably include, for example, a metal such as Ni, Cu, Ag, Pd, and Au or an alloy of Ag and Pd. First internal electrode 13a and second internal electrode 13b may further include dielectric particles having the same or substantially the same composition as that of the ceramic included in ceramic dielectric layer 12.

First internal electrode 13a and second internal electrode 13b each preferably have a thickness of, for example, about 0.2 μm or more and about 1.0 μm or less.

First external electrode 14a is provided over the entire or substantially the entire first end surface 15a of ceramic body and also wraps around first main surface 16a, second main surface 16b, first lateral surface 17a, and second lateral surface 17b from first end surface 15a. First external electrode 14a is electrically connected with first internal electrodes 13a.

First external electrode 14a includes at least a first end surface covering portion 31a, which covers first end surface 15a of ceramic body 11, and a first main surface covering portion 32a, which covers a portion of first main surface 16a and a portion of second main surface 16b.

First end surface covering portion 31a covers a first base electrode layer 41a, covering ceramic body 11, a first sintered metal layer 42a, which covers first base electrode layer 41a and includes a component different from that of first base electrode layer 41a, and a first plating layer 43a, which covers first sintered metal layer 42a. First end surface covering portion 31a preferably has a thickness of, for example, about 30 μm or less.

First main surface covering portion 32a includes first base electrode layer 41a covering ceramic body 11 and first plating layer 43a covering first base electrode layer 41a. In the present preferred embodiment, first main surface covering portion 32a includes no sintered metal layer. First main surface covering portion 32a preferably has a thickness of, for example, about 20 μm or less.

In other words, first base electrode layer 41a and first plating layer 43a are provided on first end surface covering portion 31a and first main surface covering portion 32a, whereas first sintered metal layer 42a is provided only in first end surface covering portion 31a, and not in first main surface covering portion 32a.

Second external electrode 14b is provided over the entire or substantially the entire second end surface 15b of ceramic body 11 and wraps around first main surface 16a, second main surface 16b, first lateral surface 17a, and second lateral surface 17b from second end surface 15b. Second external electrode 14b is electrically connected with second internal electrodes 13b.

Second external electrode 14b includes at least a second end surface covering portion 31b, which covers second end surface 15b of ceramic body 11, and a second main surface covering portion 32b, which covers a portion of first main surface 16a and a portion of second main surface 16b.

Second end surface covering portion 31b includes a second base electrode layer 41b, which covers ceramic body 11, a second sintered metal layer 42b, which covers second base electrode layer 41b and includes a component different from that of second base electrode layer 41b, and a second plating layer 43b, which covers second sintered metal layer 42b. Second end surface covering portion 31b preferably has a thickness of, for example, about 30 µm or less.

Second main surface covering portion 32b includes second base electrode layer 41b covering ceramic body 11 and second plating layer 43b covering second base electrode layer 41b. In the present preferred embodiment, second main surface covering portion 32b includes no sintered metal layer. Second main surface covering portion 32b preferably has a thickness of, for example, about 20 µm or less.

In other words, second base electrode layer 41b and second plating layer 43b are provided on second end surface covering portion 31b and second main surface covering portion 32b, whereas second sintered metal layer 42b is provided only in second end surface covering portion 31b, and not in the second main surface covering portion 32b.

First base electrode layer 41a and second base electrode layer 41b are layers preferably including glass and Cu, for example. Note that the metal included in first base electrode layer 41a and second base electrode layer 41b is not limited to Cu and may be, for example, a metal such as Ni, Ag, Pd, and Au or an alloy of Ag and Pd.

First base electrode layer 41a and second base electrode layer 41b are formed by applying a conductive paste including glass and Cu to a ceramic body and baking the conductive paste. A content of glass included in the conductive paste is preferably, for example, about 20% by weight or more and about 40% by weight or less. Baking may be performed simultaneously with or after firing of the ceramic body.

At a higher content of glass included in the conductive paste, glass is precipitated on the end surface of the ceramic body, so that plating is applied less easily. In the present preferred embodiment, however, first sintered metal layer 42a is provided between first base electrode layer 41a and first plating layer 43a, and second sintered metal layer 42b is provided between second base electrode layer 41b and second plating layer 43b, and thus, the occurrence of a failure during application of plating described above can be reduced or prevented.

Figure 4:
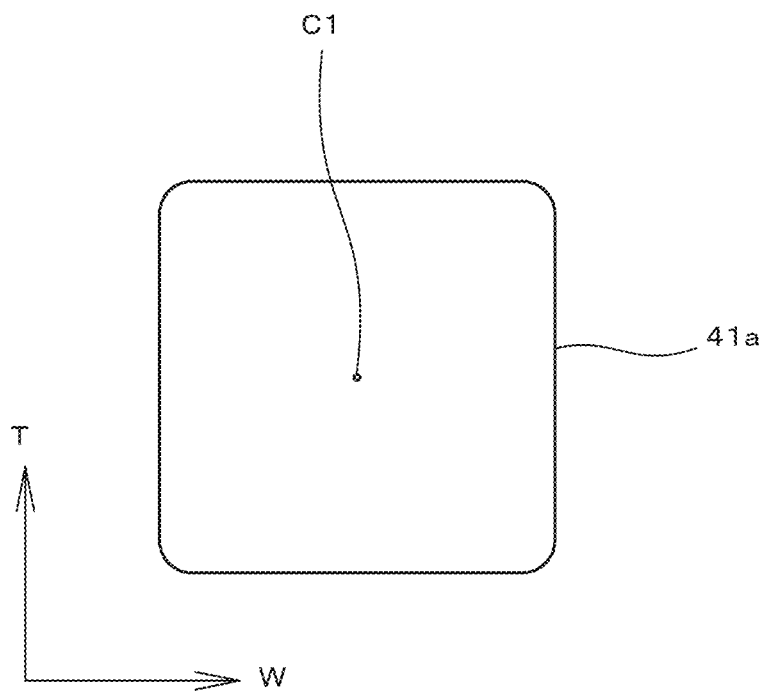
FIG. 4 is a plan view of a first base electrode layer of a first end surface covering portion, which is viewed in a length direction L.

First base electrode layer 41a in first end surface covering portion 31a and second base electrode layer 41b in second end surface covering portion 31b each preferably have a thickness which differs depending on the position in width direction W and stacking direction T. FIG. 4 is a plan view of first base electrode layer 41a of first end surface covering portion 31a, which is viewed in length direction L. When first base electrode layer 41a of first end surface covering portion 31a is viewed in length direction L, first base electrode layer 41a has a greatest thickness at a position C1, which is the center or approximate center in width direction W and stacking direction T. Compared with the thickness of first base electrode layer 41a at central position C1, first base electrode layer 41a has a smaller thickness at positions close to the outer ends in width direction W and positions close to the outer ends in stacking direction T. The same applies to the thickness of second base electrode layer 41b of second end surface covering portion 31b, which will not be described with reference to the figure.

Preferably, the portions of first base electrode layer 41a in first end surface covering portion 31a have a thickness of about 0.2 µm or less, for example. The portions are located on the outer sides in length direction L at positions S1 (see FIG. 3) of the ends of internal electrodes 13a and 13b in width direction W. The ends are located on the outermost sides in stacking direction T. In other words, preferably, first base electrode layer 41a located on the same or substantially the same level as internal electrodes 13a and 13b located on the outermost side in stacking direction T has a thickness of about 0.2 µm or less, for example, at the same or substantially the same positions in width direction W as those of the ends in width direction W of internal electrodes 13a and 13b.

Similarly, preferably, the portions of second base electrode layer 41b in second end surface covering portion 31b have a thickness of about 0.2 µm or less, for example. The portions are located on the outer sides in length direction L at the positions of the ends in width direction W of internal electrodes 13a and 13b in width direction W. The ends are located on the outermost sides in stacking direction T. The thicknesses of the above portions of first base electrode layer 41a and second base electrode layer 41b are preferably set to about 0.2 µm or less, for example, so that the film thicknesses of external electrodes 14a and 14b can be reduced while maintaining moisture resistance, thus increasing the capacitance of multilayer ceramic capacitor 10 without increasing the size thereof.

First base electrode layer 41a and second base electrode layer 41b each preferably have a thickness which differs depending on the size of multilayer ceramic capacitor 10. In a first size example, when the dimensions of multilayer ceramic capacitor 10 in length direction L, width direction W, and stacking direction T are about 0.4 mm, about 0.2 mm, and about 0.2 mm, respectively, the dimensions of each of first base electrode layer 41a and second base electrode layer 41b in length direction L, width direction W, and stacking direction T are preferably, for example, about 20 µm, about 8 µm, and about 8 µm, respectively.

Herein, the dimension of first base electrode layer 41a in length direction L refers to a dimension of first base electrode layer 41a in length direction L in first end surface covering portion 31a at position C1, which is the center or approximate center in each of width direction W and stacking direction T (see FIG. 4). The same applies to the dimension of second base electrode layer 41b in length direction L.

The dimension of first base electrode layer 41a in width direction W refers to a dimension of first base electrode layer 41a, which is located on first lateral surface 17a and second lateral surface 17b, in width direction W at a position which is the center or approximate center in each of length direction L and stacking direction T. The same applies to the dimension of second base electrode layer 41b in width direction W.

The dimension of first base electrode layer 41a in stacking direction T refers to a dimension of first base electrode layer 41a of first main surface covering portion 32a in stacking direction T, which is located at the center or approximate center in each of length direction L and width direction W. The same applies to the dimension of second base electrode layer 41b in stacking direction T.

In a second size example, when the dimensions of multilayer ceramic capacitor 10 in length direction L, width direction W, and stacking direction T are about 0.6 mm, about 0.3 mm, and about 0.3 mm, respectively, the dimensions of each of first base electrode layer 41a and second base electrode layer 41b in length direction L, width direction W, and stacking direction T are preferably, for example, about 29 μm, about 9 μm, and about 9 μm, respectively.

In a third size example, when the dimensions of multilayer ceramic capacitor 10 in length direction L, width direction W, and stacking direction T are about 1.0 mm, about 0.5 mm, and about 0.5 mm, respectively, the dimensions of each of first base electrode layer 41a and second base electrode layer 41b in length direction L, width direction W, and stacking direction T are preferably, for example, about 35 μm, about 10 μm, and about 10 μm, respectively.

In a fourth size example, when the dimensions of multilayer ceramic capacitor 10 in length direction L, width direction W, and stacking direction T are about 1.6 mm, about 0.8 mm, and about 0.8 mm, respectively, the dimensions of each of first base electrode layer 41a and second base electrode layer 41b in length direction L, width direction W, and stacking direction T are preferably, for example, about 50 μm, about 20 μm, and about 20 μm, respectively.

In a fifth size example, when the dimensions of multilayer ceramic capacitor 10 in length direction L, width direction W, and stacking direction T are about 2.0 mm, about 1.2 mm, and about 1.2 mm, respectively, the dimensions of each of first base electrode layer 41a and second base electrode layer 41b in length direction L, width direction W, and stacking direction T are preferably, for example, about 70 μm, about 30 μm, and about 30 μm, respectively.

First sintered metal layer 42a is located between first base electrode layer 41a and first plating layer 43a in first end surface covering portion 31a. In the present preferred embodiment, first sintered metal layer 42a preferably includes Ag, for example. Note that the metal included in first sintered metal layer 42a is not limited to Ag and may be Cu, for example.

As described above, first sintered metal layer 42a includes a component different from that of first base electrode layer 41a. For example, the metal included in first sintered metal layer 42a differs from the metal included in first base electrode layer 41a. Even when first sintered metal layer 42a and first base electrode layer 41a include the same metal, a case in which these layers have different components other than the metal and a case in which these layers have different metal grain sizes are included in the case in which these layers have different components.

In the present preferred embodiment, first base electrode layer 41a preferably includes glass, whereas first sintered metal layer 42a includes no glass, for example. Even when first sintered metal layer 42a and first base electrode layer 41a include the same metal, thus, these layers have different components. A difference in component between first base electrode layer 41a and first sintered metal layer 42a can be observed through wavelength dispersive X-ray fluorescence spectrometry (WDX) or energy dispersive X-ray fluorescence spectrometry (EDX). The same applies to the components of second base electrode layer 41b and second sintered metal layer 42b which will be described below.

Preferably, the metal included in first sintered metal layer 42a has a melting point lower than the melting point of the metal included in first base electrode layer 41a. When the melting point of the metal included in first sintered metal layer 42a is lower than the melting point of the metal included in first base electrode layer 41a, melting of the metal included in first base electrode layer 41a can be reduced or prevented in the formation of first sintered metal layer 42a.

Second sintered metal layer 42b is located between second base electrode layer 41b and second plating layer 43b in second end surface covering portion 31b. As described above, second sintered metal layer 42b differs from second base electrode layer 41b in component. In the present preferred embodiment, second sintered metal layer 42b preferably includes Ag, for example. Note that the metal included in second sintered metal layer 42b is not limited to Ag and may be Cu, for example.

Preferably, the metal included in second sintered metal layer 42b has a melting point lower than the melting point of the metal included in second base electrode layer 41b. When the melting point of the metal included in second sintered metal layer 42b is lower than the melting point of the metal included in second base electrode layer 41b, melting of the metal included in second base electrode layer 41b can be reduced or prevented in the formation of second sintered metal layer 42b.

In multilayer ceramic capacitor 10 of the present preferred embodiment, first sintered metal layer 42a is provided between first base electrode layer 41a and first plating layer 43a in first end surface covering portion 31a, and second sintered metal layer 42b is provided between second base electrode layer 41b and second plating layer 43b in second end surface covering portion 31b, thus providing a three-layer structure of a base electrode layer, a sintered metal layer, and a plating layer on the end side in length direction L. This can reduce or prevent water ingress from the end side of multilayer ceramic capacitor 10 in length direction L. Even when the film thicknesses of first base electrode layer 41a and second base electrode layer 41b are reduced, a decrease in moisture resistant reliability can be reduced or prevented.

First main surface covering portion 32a of first external electrode 14a and second main surface covering portion 32b of second external electrode 14b each have a two-layer structure of a base electrode layer and a plating layer, thus reducing or preventing an increase in the size of multilayer ceramic capacitor 10 in width direction W and height direction T.

First sintered metal layer 42a and second sintered metal layer 42b may have the same or substantially the same thickness or a different thickness depending on the position in width direction W and stacking direction T.

When first sintered metal layer 42a and second sintered metal layer 42b are viewed in length direction L, the thickness of each layer at the central or approximate central position in width direction W and stacking direction T is preferably, for example, about 5.0 μm or less. As described above, when first base electrode layer 41a and second end surface covering portion 31b are viewed in length direction L, the thickness of each layer is greatest at the central or approximate central position in width direction W and stacking direction T, leading to high moisture resistant reliability at the central position. Thus, the thickness of each of first sintered metal layer 42a and second sintered metal layer 42b at the central or approximate central position is preferably set to about 5.0 μm or less, for example, leading to a smaller thickness of each of first external electrode 14a and second external electrode 14b while maintaining moisture resistant reliability.

The portions of first sintered metal layer 42a and second sintered metal layer 42b preferably have a thickness of, for example, about 0.5 μm or more and about 6.0 μm or less. The portions are located on the outer sides in length direction L at the positions of the ends of internal electrodes 13a and 13b in width direction W. The ends are located on the outermost sides in stacking direction T. In other words, first sintered metal layer 42a and second sintered metal layer 42b located on the same or substantially the same level as internal electrodes 13a and 13b located on the outermost side in stacking direction T preferably have a thickness of, for example, about 0.5 µm or more and about 6.0 µm or less at the same or substantially the same positions in width direction W as those of the ends of internal electrodes 13a and 13b in width direction W. At the portion of first base electrode layer 41a of first end surface covering portion 31a and the portion of second base electrode layer 41b of second end surface covering portion 31b, which have a smaller thickness, the thicknesses of first sintered metal layer 42a and second sintered metal layer 42b are preferably set to about 0.5 µm or more and about 6.0 µm or less, for example, so that first external electrode 14a and second external electrode 14b are reduced or prevented from becoming thicker while improving the moisture resistant reliability of multilayer ceramic capacitor 10.

First sintered metal layer 42a and second sintered metal layer 42b each include a plurality of cavities. The average sizes of the cavities included in first sintered metal layer 42a and second sintered metal layer 42b are smaller than the average sizes of the cavities included in first base electrode layer 41a and second base electrode layer 41b. In other words, first sintered metal layer 42a and second sintered metal layer 42b have a more closely packed structure than first base electrode layer 41a and second base electrode layer 41b, leading to improved moisture resistance of multilayer ceramic capacitor 10.

Figure 5A:
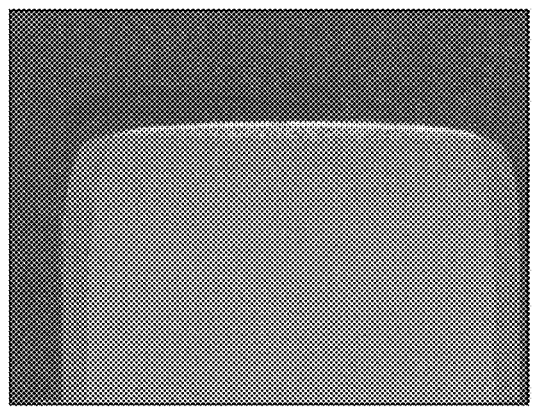
FIG. 5A shows a cross-section of a first external electrode side, which is cut at a central position of the multilayer ceramic capacitor in a width direction so as to expose a cross-section defined by the length direction and the stacking direction.
Figure 5B:
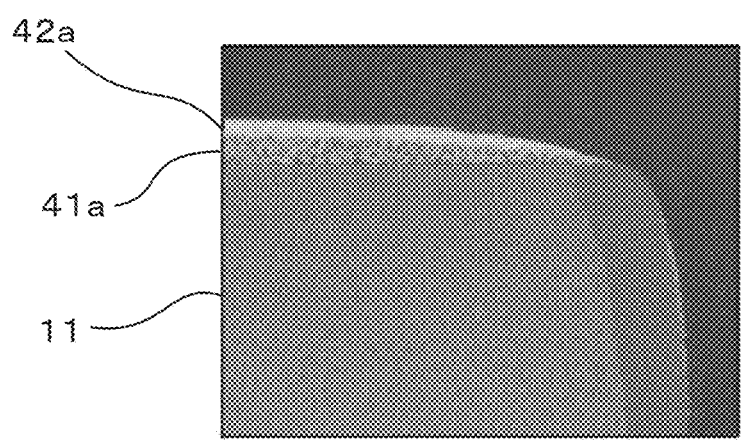
FIG. 5B shows a corner in FIG. 5A in an enlarged manner.

FIG. 5A shows a cross-section of the first external electrode 14a side, which is cut at the central or approximate central position of multilayer ceramic capacitor 10 in width direction W so as to expose a cross-section defined by length direction L and stacking direction T. FIG. 5B shows a corner of the portion shown in FIG. 5A in an enlarged manner. FIGS. 5A and 5B each show a cross-section of multilayer ceramic capacitor 10 before the formation of first plating layer 43a.

Figure 6A:
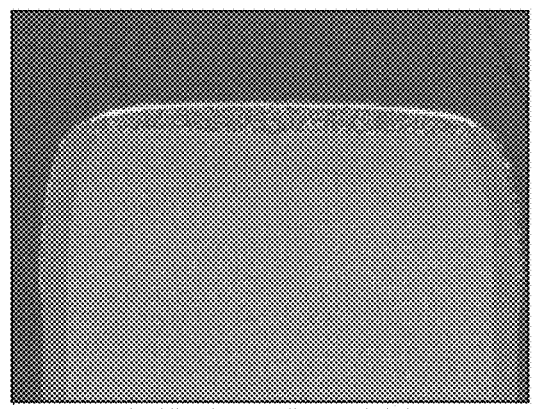
FIG. 6A shows a cross-section of a first external electrode side, which is cut at an outer position of the multilayer ceramic capacitor in the width direction so as to expose a cross-section defined by the length direction and the stacking direction.
Figure 6B:
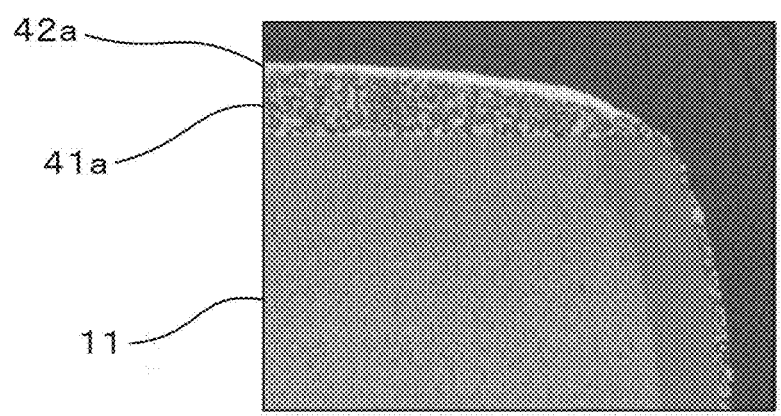
FIG. 6B shows a corner in FIG. 6A in an enlarged manner.

FIG. 6A shows a cross-section of the first external electrode 14a side, which is cut at the outer position of multilayer ceramic capacitor 10 in width direction W so as to expose a cross-section defined by length direction L and stacking direction T. FIG. 6B shows a corner of the portion shown in FIG. 6A in an enlarged manner. FIGS. 6A and 6B each show a cross-section of multilayer ceramic capacitor 10 before the formation of first plating layer 43a.

First plating layer 43a and second plating layer 43b each preferably include, for example, at least one of a metal such as Cu, Ni, Ag, Pd, and Au or an alloy of Ag and Pd. First plating layer 43a and second plating layer 43b each may include one layer or a plurality of layers.

For example, first plating layer 43a and second plating layer 43b each may preferably have a two-layer structure of a Ni plating layer and a Sn plating layer covering the Ni plating layer. The Ni plating layer prevents corrosion of first base electrode layer 41a and second base electrode layer 41b due to solder in mounting of multilayer ceramic capacitor 10. The Sn plating layer improves wettability of solder in mounting of multilayer ceramic capacitor 10.

First plating layer 43a and second plating layer 43b each preferably have a thickness of, for example, about 1 µm or more and about 6 µm or less. In the first to fifth size examples described above, the dimensions of first plating layer 43a and second plating layer 43b in length direction L, width direction W, and stacking direction T can preferably be, for example, about 6 µm, about 6 µm, and about 6 µm, respectively.

Method of Manufacturing Multilayer Ceramic Capacitor

A non-limiting example of a method of manufacturing multilayer ceramic capacitor 10 described above will now be described.

First, a ceramic green sheet and an internal-electrode conductive paste are each prepared. The ceramic green sheet and the internal-electrode conductive paste may be publicly known ones including an organic binder and an organic solvent, respectively.

Subsequently, the internal-electrode conductive paste is printed on the ceramic green sheet to form an internal electrode pattern. The internal-electrode conductive paste can be printed by a printing method, such as screen printing or gravure printing, for example.

Subsequently, a predetermined number of ceramic green sheets with no internal electrode pattern are stacked, ceramic green sheets with the internal electrode pattern are stacked thereon sequentially, and a predetermined number of ceramic green sheets with no internal electrode pattern are stacked thereon, thus producing a mother stack.

Subsequently, the mother stack is pressed in the stacking direction by a cutting method, such as rigid body pressing or hydrostatic pressing, for example, and then, the mother stack is cut in a prescribed size by a cutting method, such as press cutting, dicing, or laser, for example, to obtain a multilayer chip. Then, the corners and ridges of the multilayer chip may be rounded by barrel polishing or the like, for example.

Subsequently, an external-electrode conductive paste is applied to the opposite end surfaces of the multilayer chip, and portions of the opposite main surfaces and portions of the opposite lateral surfaces. The external-electrode conductive paste preferably includes, for example, Cu powder, glass frit, and organic solvent. The external-electrode conductive paste is applied by dipping, for example.

Subsequently, the multilayer chip coated with the external-electrode conductive paste is fired. The firing temperature is preferably, for example, about 900° C. or more and about 1300° C. or less, although it depends on a ceramic material or conductive paste material to be used. Consequently, a ceramic body and base electrode layers of external electrodes are formed.

Subsequently, a Ag nano-ink is applied onto the base electrode layers on the opposite end surface sides of the multilayer chip. The Ag nano-ink may preferably include a binder, a glass component, or the like, for example. The Ag nano-ink can be applied by screen printing, for example. Note that a raw material to be applied is not limited to the Ag nano-ink, which may be Cu nano-ink or a paste including a conductive polymer.

Subsequently, the multilayer chip coated with the Ag nano-ink is dried. The multilayer chip is dried on the conditions of about 150° C. and about 10 to about 20 minutes in an oven, for example. The drying conditions are adjusted as appropriate in accordance with the size of a Ag particle or the like.

Consequently, sintered metal layers are formed on the base electrode layers on the opposite end surface sides of the multilayer chip.

Lastly, plating layers are formed to cover the entire or substantially the entire sintered metal layer and base electrode layers located at portions of the opposite main surfaces and portions of the opposite lateral surfaces. The plating layer is preferably formed by, for example, electrolytic plating to have a two-layer structure of a Ni plating and a Sn plating covering the Ni plating layer.

The multilayer ceramic capacitor can be manufactured through the above process.

Moisture Resistance Test

A moisture resistance test was conducted to observe time degradation in insulation resistance by application of a direct-current voltage of about 6.3 V in the environment of about 65° C. and about 90 RH %. Herein, 72 multilayer ceramic capacitors 10 according to the present preferred embodiment and 72 conventional multilayer ceramic capacitors of 0603 size were prepared, which had a size of about 0.6 mm, about 0.3 mm, and about 0.3 mm in length direction L, width direction W, and stacking direction T, respectively. Also, 72 multilayer ceramic capacitors 10 according to the present preferred embodiment and 72 conventional multilayer ceramic capacitors of 0402 size were prepared, which had a size of about 0.4 mm, about 0.2 mm, and about 0.2 mm in length direction L, width direction W, and stacking direction T, respectively. The conventional multilayer ceramic capacitor includes an external electrode including a base electrode layer and a plating layer and includes no sintered metal layer.

For the multilayer ceramic capacitors of 0603 size, no multilayer ceramic capacitors 10 according to the present preferred embodiment were determined to have deteriorated insulation resistance, in which an insulation resistance was equal to or less than a prescribed value, whereas 11 conventional multilayer ceramic capacitors were determined to have deteriorated insulation resistance.

For the multilayer ceramic capacitors of 0402 size, no multilayer ceramic capacitors 10 according to the present preferred embodiment were determined to have deteriorated insulation resistance, whereas four conventional multilayer ceramic capacitors were determined to have deteriorated insulation resistance.

In other words, multilayer ceramic capacitor 10 according to the present preferred embodiment has higher moisture resistant reliability than a conventional multilayer ceramic capacitor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a ceramic body including a stack of a plurality of dielectric layers and a plurality of internal electrodes and including a first main surface and a second main surface facing each other in a stacking direction, a first lateral surface and a second lateral surface facing each other in a width direction orthogonal or substantially orthogonal to the stacking direction, and a first end surface and a second end surface facing each other in a length direction orthogonal or substantially orthogonal to the stacking direction and the width direction; and
    an external electrode electrically connected with the plurality of internal electrodes and provided on each of the first end surface and the second end surface of the ceramic body; wherein
    the external electrode includes:
        an end surface covering portion covering each of the first end surface and the second end surface; and
        a main surface covering portion covering a portion of the first main surface and a portion of the second main surface;
    the end surface covering portion and the main surface covering portion each include:
        a base electrode layer covering the ceramic body; and
        a plating layer covering the base electrode layer;
    the end surface covering portion further includes, between the base electrode layer and the plating layer, a sintered metal layer including a component different from that of the base electrode layer; and
    cavities included in the sintered metal layer have an average size smaller than an average size of cavities included in the base electrode layer.

2. The multilayer ceramic capacitor according to claim 1, wherein the base electrode layer includes glass.

3. The multilayer ceramic capacitor according to claim 1, wherein the main surface covering portion does not include the sintered metal layer.

4. The multilayer ceramic capacitor according to claim 1, wherein a metal included in the sintered metal layer has a melting point lower than a melting point of a metal included in the base electrode layer.

5. The multilayer ceramic capacitor according to claim 1, wherein a portion of the sintered metal layer has a thickness of about 0.5 µm or more, the portion being located on an outer side in the length direction at a position of an end of one of the plurality of internal electrodes in the width direction, the end being located on an outermost side in the stacking direction.

6. The multilayer ceramic capacitor according to claim 1, wherein a portion of the base electrode layer of the end surface covering portion has a thickness of about 0.2 µm or less, the portion being located on an outer side in the length direction at a position of an end of one of the plurality of internal electrodes in the width direction, the end being located on an outermost side in the stacking direction.

7. The multilayer ceramic capacitor according to claim 1, wherein dimensions of the multilayer ceramic capacitor in the length direction, the width direction, and the stacking direction are about 0.6 mm, about 0.3 mm, and about 0.3 mm, respectively.

8. The multilayer ceramic capacitor according to claim 7, wherein dimensions of the base electrode layer in the length direction, the width direction, and the stacking direction are about 29 µm, about 9 µm, and about 9 µm, respectively.

9. The multilayer ceramic capacitor according to claim 1, wherein dimensions of the multilayer ceramic capacitor in the length direction, the width direction, and the stacking direction are about 0.4 mm, about 0.2 mm, and about 0.2 mm, respectively.

10. The multilayer ceramic capacitor according to claim 8, wherein dimensions of the base electrode layer in the length direction, the width direction, and the stacking direction are about 20 µm, about 8 µm, and about 8 µm, respectively.

11. The multilayer ceramic capacitor according to claim 1, wherein dimensions of the multilayer ceramic capacitor in the length direction, the width direction, and the stacking direction are about 1.0 mm, about 0.5 mm, and about 0.5 mm, respectively.

12. The multilayer ceramic capacitor according to claim 7, wherein dimensions of the base electrode layer in the length direction, the width direction, and the stacking direction are 35 µm, about 10 µm, and about 10 µm, respectively.

13. The multilayer ceramic capacitor according to claim 1, wherein each of the plurality of dielectric layers is made of a ceramic material mainly including $BaTiO_3$, $CaTiO_3$, $SrTiO_3$, or $CaZrO_3$.

14. The multilayer ceramic capacitor according to claim 1, wherein the plurality of dielectric layers include external-layer dielectric layers on opposite outer sides of the ceramic body and internal-layer dielectric layers therebetween.

15. The multilayer ceramic capacitor according to claim 14, wherein each of the external-layer dielectric layers has a thickness of about 10 μm or more and about 50 μm or less.

16. The multilayer ceramic capacitor according to claim 14, wherein each of the internal-layer dielectric layers has a thickness of about 0.4 μm or more and about 5.0 μm or less.

17. The multilayer ceramic capacitor according to claim 1, wherein each of the plurality of internal electrodes has a thickness of about 0.2 μm or more and about 1.0 μm or less.

18. The multilayer ceramic capacitor according to claim 2, wherein the base electrode layer further includes Cu.

* * * * *